(12) United States Patent
Ellison et al.

(10) Patent No.: US 11,900,300 B2
(45) Date of Patent: Feb. 13, 2024

(54) COACH-ASSIST CONTROLLER FOR CUSTOMER SERVICE REPRESENTATIVE (CSR) INTERACTIONS

(71) Applicant: T-Mobile USA, Inc., Bellevue, WA (US)

(72) Inventors: James Ellison, Issaquah, WA (US); Mark Hanson, Plano, TX (US); Joel Werdell, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 273 days.

(21) Appl. No.: 17/345,355

(22) Filed: Jun. 11, 2021

(65) Prior Publication Data
US 2021/0390491 A1   Dec. 16, 2021

Related U.S. Application Data

(60) Provisional application No. 63/037,993, filed on Jun. 11, 2020.

(51) Int. Cl.
*G06Q 10/0639* (2023.01)
*G06Q 30/0201* (2023.01)
*G10L 15/18* (2013.01)
*G06F 9/451* (2018.01)

(52) U.S. Cl.
CPC ....... *G06Q 10/06398* (2013.01); *G06F 9/453* (2018.02); *G06Q 30/0201* (2013.01); *G10L 15/1807* (2013.01); *G10L 15/1815* (2013.01)

(58) Field of Classification Search
None
See application file for complete search history.

(56) References Cited

U.S. PATENT DOCUMENTS

| | | | |
|---|---|---|---|
| 8,161,386 B1 * | 4/2012 | Mark | G06F 9/453 715/708 |
| 8,195,468 B2 * | 6/2012 | Weider | G10L 15/22 704/250 |
| 10,880,435 B2 | 12/2020 | Fang et al. | |
| 11,076,047 B1 | 7/2021 | Clodore et al. | |
| 11,367,080 B2 | 6/2022 | Konig et al. | |

(Continued)

FOREIGN PATENT DOCUMENTS

| | | | | |
|---|---|---|---|---|
| WO | WO-2007106113 A2 * | 9/2007 | | G10L 15/26 |
| WO | WO-2018129389 A1 * | 7/2018 | | |

OTHER PUBLICATIONS

Colette "A Mentor Program Improve Performance and Retention of Customer Service Representative", Sep. 2009, ePublications at Regis University, pp. 1-111 (Year: 2009).*

(Continued)

*Primary Examiner* — Romain Jeanty

(57) ABSTRACT

This disclosure describes techniques that allow a coach-assist controller to provide coach support to a customer service representative (CSR) during an ongoing consumer-CSR interaction. The coach-assist controller may intercept a consumer-CSR interaction and generate corresponding interaction data. The coach-assist controller may further analyze the interaction data to infer a current state of the consumer-CSR interaction, and in doing so, determine whether to request coach support for the CSR.

19 Claims, 9 Drawing Sheets

(56) References Cited

U.S. PATENT DOCUMENTS

| | | |
|---|---|---|
| 11,625,556 B1* | 4/2023 | Gaeta .............. H04M 3/5175 706/12 |
| 2006/0080107 A1 | 4/2006 | Hill et al. |
| 2017/0163584 A1 | 6/2017 | Meng et al. |
| 2018/0007102 A1 | 1/2018 | Klein et al. |
| 2020/0019893 A1 | 1/2020 | Lu |
| 2020/0065857 A1 | 2/2020 | Lagi et al. |
| 2021/0004817 A1 | 1/2021 | Adibi et al. |
| 2021/0004828 A1 | 1/2021 | Adibi et al. |
| 2021/0157834 A1 | 5/2021 | Sivasubramanian et al. |
| 2021/0158234 A1 | 5/2021 | Sivasubramanian et al. |
| 2021/0203784 A1 | 7/2021 | Konig et al. |
| 2021/0272584 A1 | 9/2021 | McAlpine et al. |
| 2022/0046129 A1 | 2/2022 | Clodore et al. |
| 2022/0215323 A1 | 7/2022 | Dake et al. |

OTHER PUBLICATIONS

Ehrens, "Customer Segmentation", Apr. 2019, URL: https://www.techtarget.com/searchcustomerexperience/definition/customer-segmentation (Year: 2019).

Lee, "Machine learning for enterprises" URL: https://www.sciencedirect.com/science/article/abs/pii/S0007681319301521?via%3Dihub (Year: 2019).

U.S. Appl. No. 17/317,751, Office Action dated Apr. 12, 2023, 67 pages.

U.S. Appl. No. 17/317,765, Final Office Action dated Apr. 17, 2023, 29 pages.

U.S. Appl. No. 17/317,765, Office Action dated Oct. 4, 2022, 29 pages.

U.S. Appl. No. 17/370,844, Office Action dated Jul. 20, 2023, 49 pages.

* cited by examiner

COACH-ASSIST CONTROLLER FOR CUSTOMER SERVICE REPRESENTATIVE (CSR) INTERACTIONS

RELATED APPLICATION

This application claims priority to a commonly owned U.S. Provisional Patent Application No. 63/037,993, filed on Jun. 11, 2020, titled "Coach-Assist Controller for Consumer-CSR Interactions," which is herein incorporated by reference in its entirety.

BACKGROUND

It has become common for a provider of goods and/or services to operate a customer support center. A customer of the provider may contact the customer support center and thereby be connected with a customer service representative ("CSR") who can help the customer with certain issues, such as a service reconfiguration, device reconfiguration, accounting issues, or any combination thereof.

A customer support center may have many CSRs with varying levels of experience and ability. CSRs with high levels of experience may be more effective in achieving high levels of customer satisfaction compared with CSRs with lower levels of experience. Accordingly, it is desirable that the performance of CSRs with less experience. However, conventional systems and methods to improve the performance of less experienced CSRs have multiple shortcomings.

For example, some customer support centers may record calls and conduct systematic reviews. However, the review process is labor-intensive and while the resulting feedback can be used to train CSRs, the time required to conduct a systemic review means that the feedback is not available to support real-time, in progress, service calls.

Similarly, some customer support centers may have supervisors "walk the floor," surveying whether less experienced CSRs need assistance. However, the effectiveness of the "walk the floor" approach depends on the supervisor's ability to determine which CSRs require assistance based on what the supervisor can see and hear. Accordingly, many customer support calls that could have benefitted from an interaction with a more experienced CSR are left unsupported.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
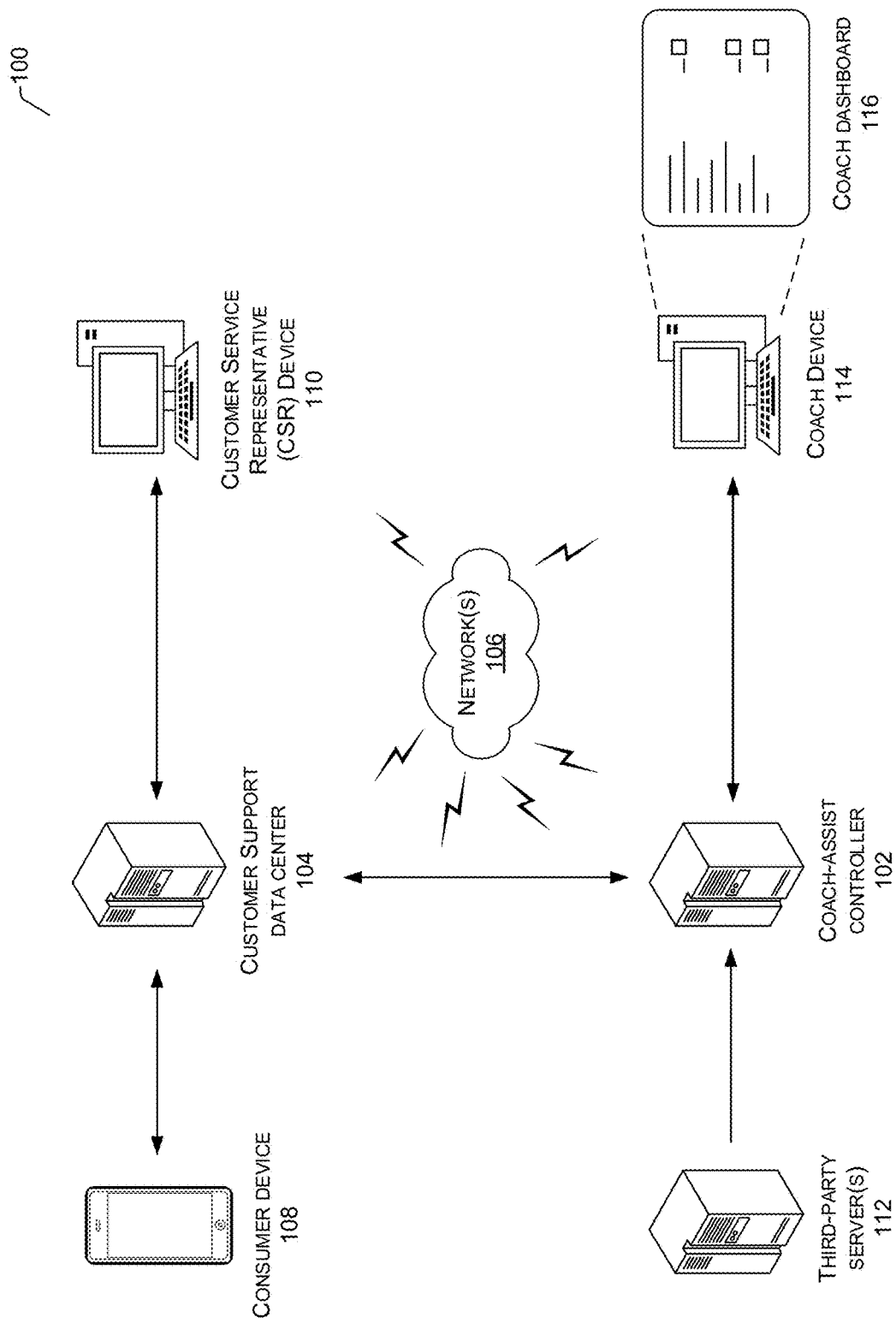
FIG. 1 illustrates an example computing environment that facilitates the operation of the coach-assist controller.

This disclosure describes techniques for monitoring real-time consumer-customer service representative (CSR) interactions that may benefit from coach support. Consumers often reach out to CSRs with service requests to help resolve service-related issues. Service requests may include service categories such as accounting support, device support, service support, and any combination thereof.

To facilitate consumer-CSR interactions, CSRs may have access to a predefined list of service resolutions for known consumer service requests. Notwithstanding, each consumer-CSR interaction may be different, even though typically, most relate to the same consumer service requests. The success of a consumer-CSR interaction can be aided, in part, by an effective dialogue between a CSR and the consumer. In other words, the means by which a service resolution is communicated to the consumer may aid in the success of the interaction. A successful interaction may be measured by whether the service request was resolved on a first call, the time taken to resolve the service request, and the sentiment, or change in sentiment, of the consumer during the interaction.

Accordingly, this disclosure describes techniques that allow a coach-assist controller to provide coach support to a customer service representative (CSR) during an ongoing consumer-CSR interaction. The coach-assist controller may intercept a consumer-CSR interaction and generate corresponding interaction data. The coach-assist controller may further analyze the interaction data to infer a current state of the consumer-CSR interaction, and in doing so, determine whether to request coach support for the CSR.

In one embodiment, the coach-assist controller may monitor the consumer-CSR interaction, and in doing so, generate interaction data. The interaction data may include audio segments of the consumer-CSR interaction, transcribed text of the audio segments, a consumer profile, and environmental data associated with a geolocation of the consumer device.

The coach-assist controller may analyze the interaction data using intermediary data model(s) that each focus on a discrete aspect of the consumer-CSR interaction. The intermediary data model(s) may include a topic data model, a sentiment data model, a consumer profile data model, a context data model, and a profit-loss data model. Each intermediary data model is configured to generate a data inference relating to a discrete aspect of the consumer-CSR interaction.

Further, the output of each data model may be received, as an input, into an aggregate data model. The aggregate data model is configured to aggregate the data inferences from each of the intermediary data models to develop a weighted interaction score. The weighted interaction score may then be used to determine the current state of the consumer-CSR interaction, and in turn, whether the consumer-CSR interaction may benefit from a coach support.

The weighted-interaction score may be alpha-numeric (i.e. 0 to 10, 0 to 1.0, or A to F), descriptive, (i.e. low, medium, or high), based on color (i.e. green, yellow, or red), or any other suitable rating scale. A high score (i.e. 0.7 to 1.0, high, red) indicates that an interaction assist is likely to benefit the consumer-CSR interaction. A medium score (i.e. 0.4 to 0.6, medium, yellow) indicates that an interaction assist may be helpful. A low score (i.e. 0.1 to 0.3, low, green) indicates that an interaction assist is not required.

The coach-assist controller may receive the weighted-interaction score and selectively deliver a coach-assist request to a selected coach. The coach-assist controller may automatically initiate a coach support request for weighted-interaction scores determined as "high." The decision engine may selectively transmit a coach support request for weighted interaction scores determined as "medium" based on the availability of a coach, and the other pending priorities.

The coach-assist controller may employ various methods to select a coach for coach support. The coach selection methods include a designated coach selection method, a floating coach selection method, or a profit-loss coach selection method.

Once a coach has been selected, the selected coach is presented with a coach-assist dashboard. The coach-assist dashboard is intended to provide a coach device with a rolling account of an ongoing consumer-CSR interaction. The coach-assist dashboard may include a coach prompt, which provides a platform for the coach to send text messages, audio messages (e.g., audio prompt), or a suitable combination of both, to the CSR, while the CSR is engaged in the consumer-CSR interaction.

Analysis of interaction data associated with a consumer-CSR interaction may occur in real-time or near real-time. The term "real-time" when used to describe the analysis of a consumer-CSR interaction, refers to the analysis of a current, ongoing consumer-CSR interaction relative to actual time. For example, the coach-assist controller may analyze the interaction data associated with the consumer-CSR interaction instantaneously while the consumer-CSR interaction is ongoing. The term "near real-time" when used to describe the analysis of a consumer-CSR interaction, refers to a temporal delay between the time that an instance of an ongoing consumer-CSR interaction occurs and the time that the coach-assist controller analyzes the corresponding interaction data. The time delay may be based on any suitable time interval, such as ten milliseconds, one second, ten seconds, or thirty sections.

Further, the term "techniques," as used herein, may refer to system(s), method(s), computer-readable instruction(s), module(s), algorithms, hardware logic, and/or operation(s) as permitted by the context described above and through the document.

FIG. 1 illustrates an example computing environment that facilitates the operation of the coach-assist controller. The computing environment 100 may comprise a coach-assist controller 102 that is configured to intercept consumer-CSR interactions at a customer support data center 104 via one or more network(s) 106. The customer support data center 104 receives a service support request from a consumer device 108. To resolve the service support request, the customer support data center 104 may establish a communicative connection between the consumer device 108 and a CSR device 110, thereby creating an ongoing consumer-CSR interaction.

In various embodiments, the coach-assist controller 102 may monitor ongoing consumer-CSR interactions, in real-time, that are facilitated via the customer support data center 104. In one embodiment, the coach-assist controller 102 may monitor substantially all consumer-CSR interactions. In another embodiment, the coach-assist controller 102 may monitor a portion, but not all, consumer-CSR interactions, subject to a triggering event. The triggering event may correspond to consumer-CSR interactions that involve a particular topic, a particular consumer, a particular CSR, a particular service issue request, or any suitable combination thereof. In yet another embodiment, the coach-assist controller 102 may monitor a random selection, but not all, consumer-CSR interactions.

The coach-assist controller 102 may capture and analyze interaction data associated with a consumer-CSR interaction to determine whether a coach support may be beneficial for the CSR. As part of the analysis, the coach-assist controller 102 may capture environmental data from third-party server(s) 112 via one or more network(s) 106. The coach-assist controller 102 may glean environmental data from the third-party server(s) 112 to determine whether the environmental data affects the consumer based on knowledge of the consumer's consumer profile or the consumer's geolocation. Environmental data may include real-time public or private events, current and forecast weather conditions, and real-time and forecast service issues (e.g., telecommunication service outage, congestion, etc.). For example, a current cultural event associated with the consumer's demographic may affect the consumer's disposition during the consumer-CSR interaction. Similarly, weather conditions impacting the consumer's geolocation may impact the consumer's disposition during the consumer-CSR interaction.

Following the analysis of a consumer-CSR interaction, in real-time or near-real-time, the coach-assist controller 102 may selectively elect to solicit a coach support from a selected coach. In doing so, the coach-assist controller 102 may further interact with a coach device 114 associated with a selected coach via one or more network(s) 106. In response to receiving a request to accept the coach support request, the coach-assist controller 102 may establish a communication channel between the coach device 114 and the CSR device 110 via a coach-assist dashboard 116 that is presented on a user interface of the coach device 114. In other words, the coach-assist controller 102 may act as a conduit for communications between the CSR device 110—via the customer support data center—and the coach device 114.

The one or more network(s) 106 may include public networks such as the Internet, private networks such as an institutional and/or personal intranet, or some combination of a private and public network(s). The one or more network(s) can also include any suitable type of wired and/or wireless network, including but not limited to local area network (LANs), wide area network(s) (WANs), satellite networks, cable networks, Wi-Fi networks, Wi-Max networks, mobile communications networks (e.g., 5G-NR, LTE, 3G, 2G), or any suitable combination thereof.

Moreover, the consumer device 108, CSR device 110, and coach device 114 may include any suitable electronic device, such as a television unit, a multimedia streaming device, a cellular phone, a smartphone, a tablet computer, an electronic reader, a media player, a gaming device, a personal computer (PC), a laptop computer, etc. The consumer device 108, CSR device 110, and coach device 114 may also include network devices that act as intermediaries with the Internet. It is noteworthy that the Internet is accessible via one or more network(s) 106. In some examples, the consumer device 108, CSR device 110, and coach device 114 may include a subscriber identity module (SIM), such as an eSIM, to identify each device to a telecommunication service provider (also referred to herein, as "telecommunications network").

The coach-assist controller 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the customer support data center 104, the consumer device 108, the CSR device 110, and the coach device 114, via the one or more network(s) 106.

Figure 2:
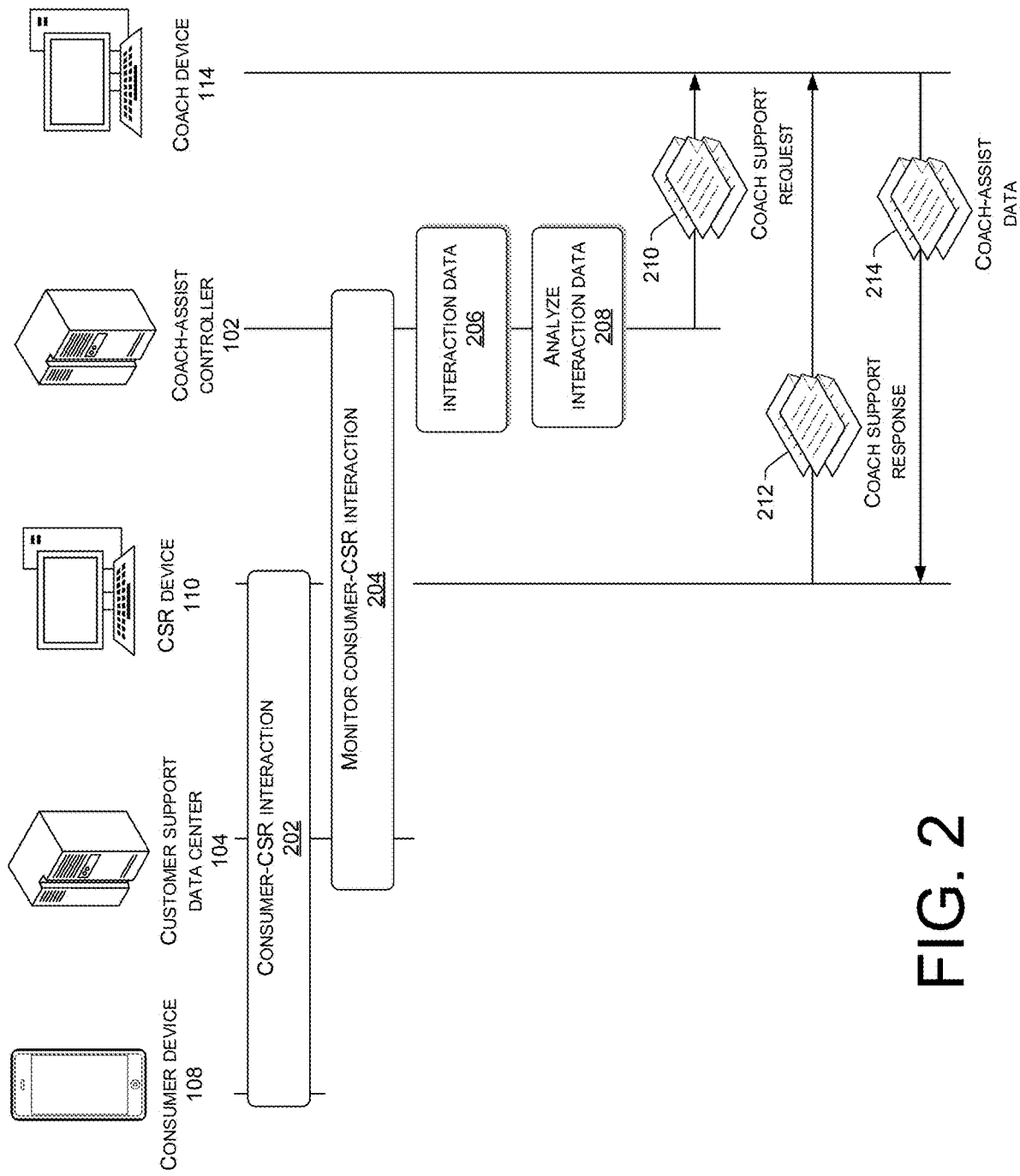
FIG. 2 illustrates a block diagram of an interaction between a coach-assist controller and an ongoing consumer-CSR interaction.

FIG. 2 illustrates a block diagram of an interaction between a coach-assist controller and an ongoing consumer-CSR interaction. In the illustrated example, the customer support data center 104 may facilitate a consumer-CSR interaction 202 between a consumer device 108 and a CSR device 110. At 204, the coach-assist controller 102 may monitor the consumer-CSR interaction 202, and in doing so, generate interaction data 206. The interaction data 206 may include audio segments of the consumer-CSR interaction, transcribed text of the audio segments, a consumer profile, and environmental data associated with a geolocation of the consumer device.

The coach-assist controller 102 may further analyze the interaction data 206 to determine the current state of the ongoing consumer-CSR interaction 202. At 208, the coach-assist controller 102 may analyze the interaction data 206. The analysis may involve multiple intermediary data model(s) that each focus on a discrete aspect of the consumer-CSR interaction 202, such as topic, sentiment, context, consumer profile, and profit-loss. An overall analysis may be performed using the aggregate data model that receives, as an input, the data inferences generated by the intermediary data model(s). The aggregate data model may generate a weighted-interaction score, which may be used to infer the current state of the consumer-CSR interaction 202.

The current state of the consumer-CSR interaction may comprise a first state in which a coach-assist is unlikely to provide benefit to the CSR, a second state in which a coach support may, or may not, provide benefit to the CSR, and a third state in which a coach support is likely to provide benefit to the CSR. If the current state of the consumer-CSR interaction 202 indicates that coach support may benefit the CSR during the consumer-CSR interaction (e.g., second state or third state), the coach-assist controller 102 may generate a coach support request 210 for delivery to a coach device 114 of a selected coach.

The coach-assist controller 102 may receive a coach-assist response 212 to accept or decline the coach support request 210. If the coach-assist response 212 is to accept the coach support request 210, the coach-assist controller 102 may generate coach-assist data 214 for delivery to the coach device 114. The coach-assist data 214 may be configured to establish a coach-assist dashboard 116 on a user interface of the coach device 114, and further provide a communication interface to the CSR, through which the selected coach may provide support to the CSR during the consumer-CSR interaction 202.

Figure 3:
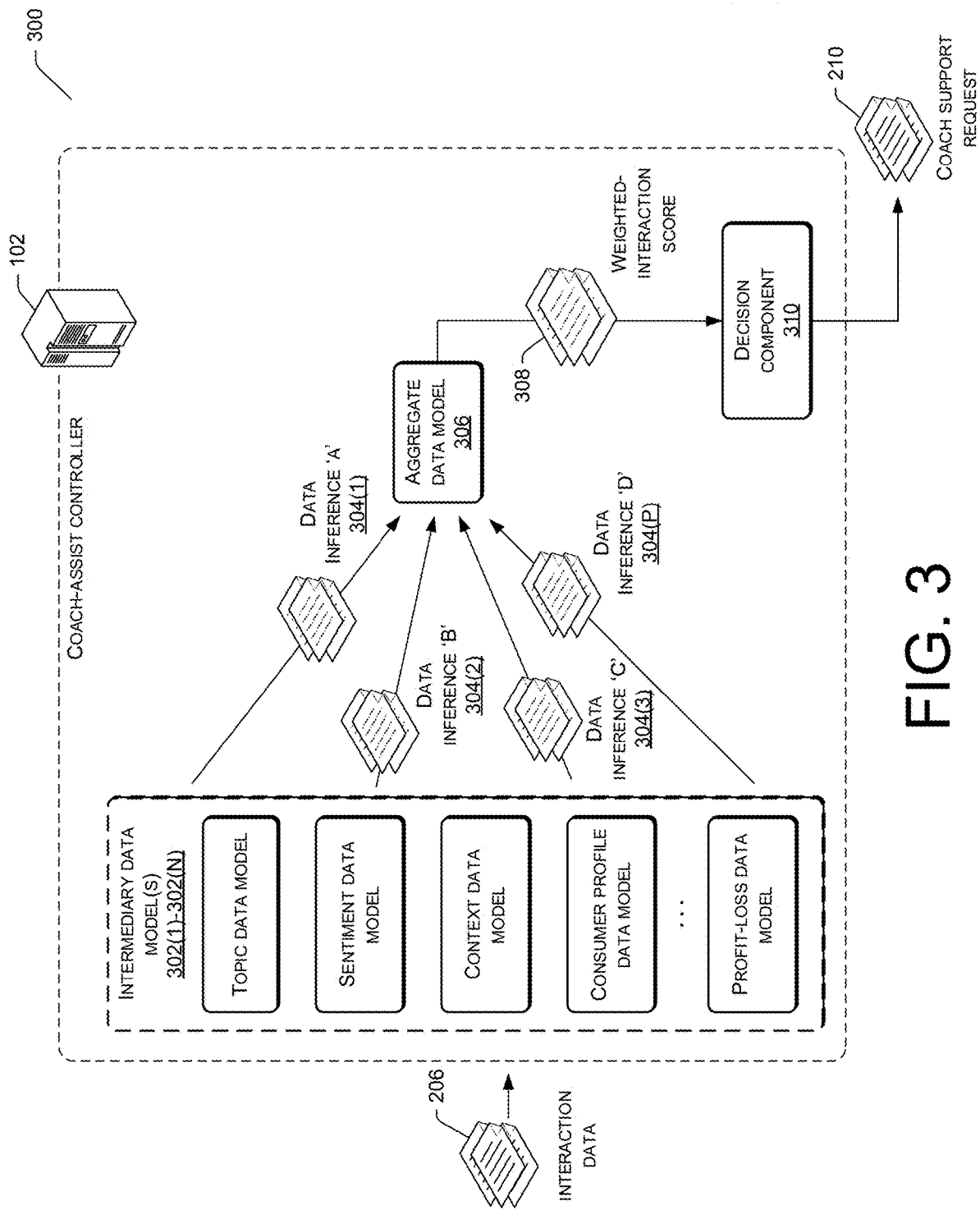
FIG. 3 illustrates a block diagram of a coach-assist controller that is configured to generate a coach support request based on analyses of interaction data using one or more intermediary data models and an aggregate data model.

FIG. 3 illustrates a block diagram of a coach-assist controller that is configured to generate a coach support request based on analyses of interaction data using one or more intermediary data models and an aggregate data model.

In the illustrated example, the coach-assist controller 102 may receive interaction data 206 associated with an ongoing consumer-CSR interaction. The interaction data 206 may include audio segments of the ongoing consumer-CSR interaction, transcribed text of the audio segments, a consumer profile, and environmental data gleaned from third-party servers that may impact the consumer's disposition during the ongoing consumer-CSR interaction.

The coach-assist controller 102 may be configured to analyze the interaction data 206 using intermediary data model(s) 302(1)-302(N). The intermediary data model(s) 302(1)-302(N) may include a topic data model, a sentiment data model, a context data model, a consumer profile data model, and a profit-loss data model. The topic data model may be configured to infer the topic(s) of a consumer-CSR interaction. The sentiment data model may be configured to infer the sentiment or change in sentiment of a consumer during a consumer-CSR interaction. The context data model may infer whether environmental data that may impact a consumer's disposition during a consumer-CSR interaction, based on a consumer profile or consumer geolocation. The consumer profile data model may infer expected consumer behavior based on the consumer profile. The profit-loss data model may infer a profit or loss record associated with service resolutions requested by a consumer or offered by a CSR during the ongoing consumer-CSR interaction.

Each of the intermediary data model(s) 302(1)-302(N) may generate data inference(s) 304(1)-304(P) that can be received, as an input, by the aggregate data model 306. Each of the data inference(s) 304(1)-304(P) may include an accuracy score that indicates the degree of confidence associated with a data inference. For example, the data inference associated with the sentiment data model may comprise an inferred sentiment—expressed as a sentiment score —and a sentiment accuracy score, which indicates the degree of confidence associated with the inferred sentiment. Similarly, the data inference associated with the context data model may comprise an inferred context and a context accuracy score, which indicates the degree of confidence associated with the inferred context.

The aggregate data model 306 may receive the data inference(s) 304(1)-304(P), as input, and generate a weighted-interaction score 308. The weighted-interaction score 308 may be configured to reflect whether coach support of a CSR would be beneficial to the ongoing consumer-CSR interaction.

Moreover, the decision component 310 of the coach-assist controller 102 may infer a current state of the ongoing consumer-CSR interaction based at least in part on the weighted-interaction score 308. The current state may comprise one of a first state, a second state, or a third state. The first state may infer that coach support is unlikely to provide benefit to a CSR during an ongoing consumer-CSR interaction. The second state may infer that coach support may, or may not, provide benefit to the CSR during an ongoing consumer-CSR interaction. The third state may infer that a coach support is likely to provide benefit to the CSR during an ongoing consumer-CSR interaction.

If the decision component 310 determines that coach support is likely to benefit a CSR during an ongoing consumer-CSR interaction (e.g., second state or third state), the decision component 310 may elect to solicit a coach support request 210 from a selected coach.

Figure 4A:
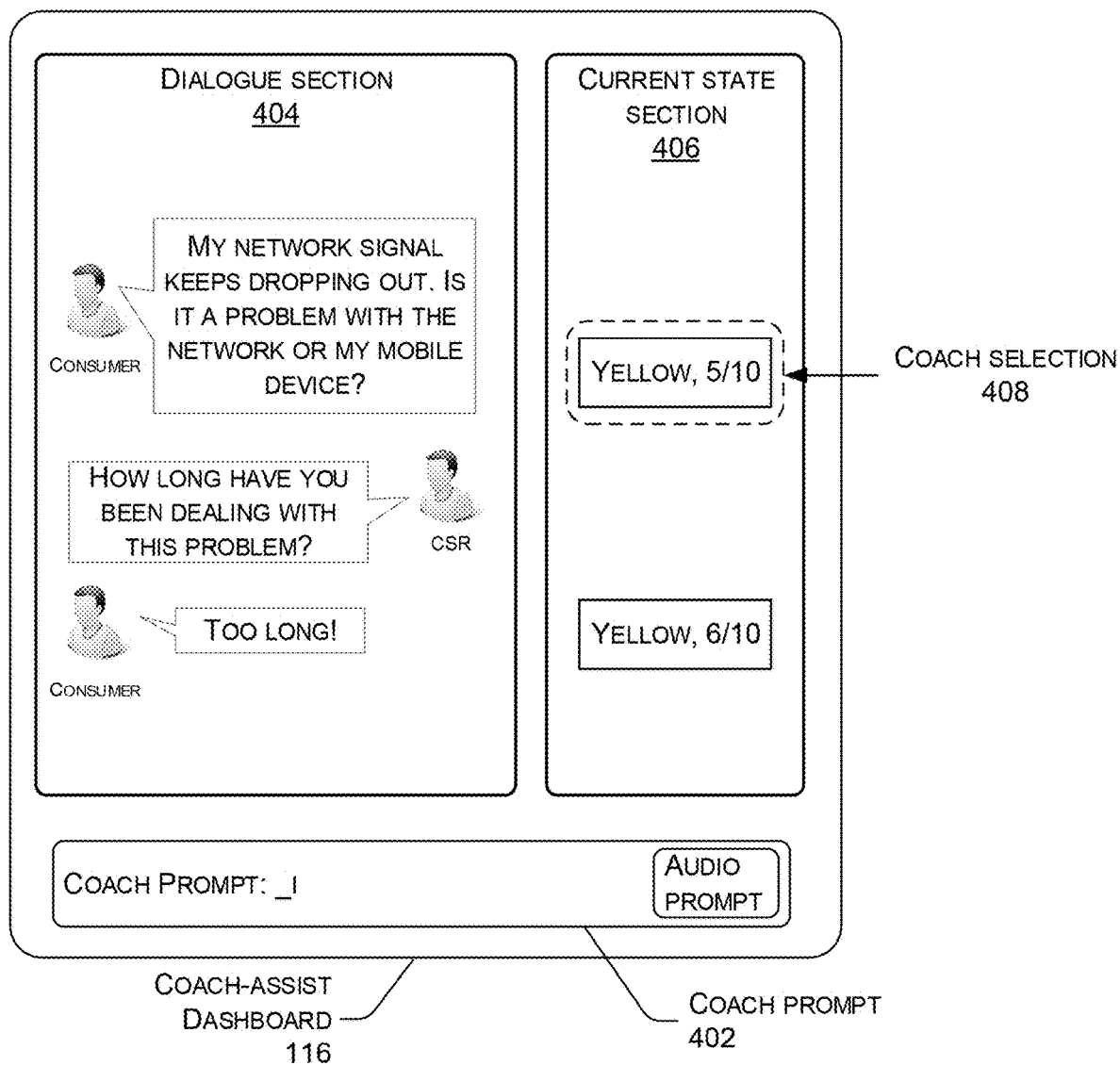
FIGS. 4A and 4B illustrate exemplary presentations of a coach-assist dashboard of a coach device.
Figure 4B:
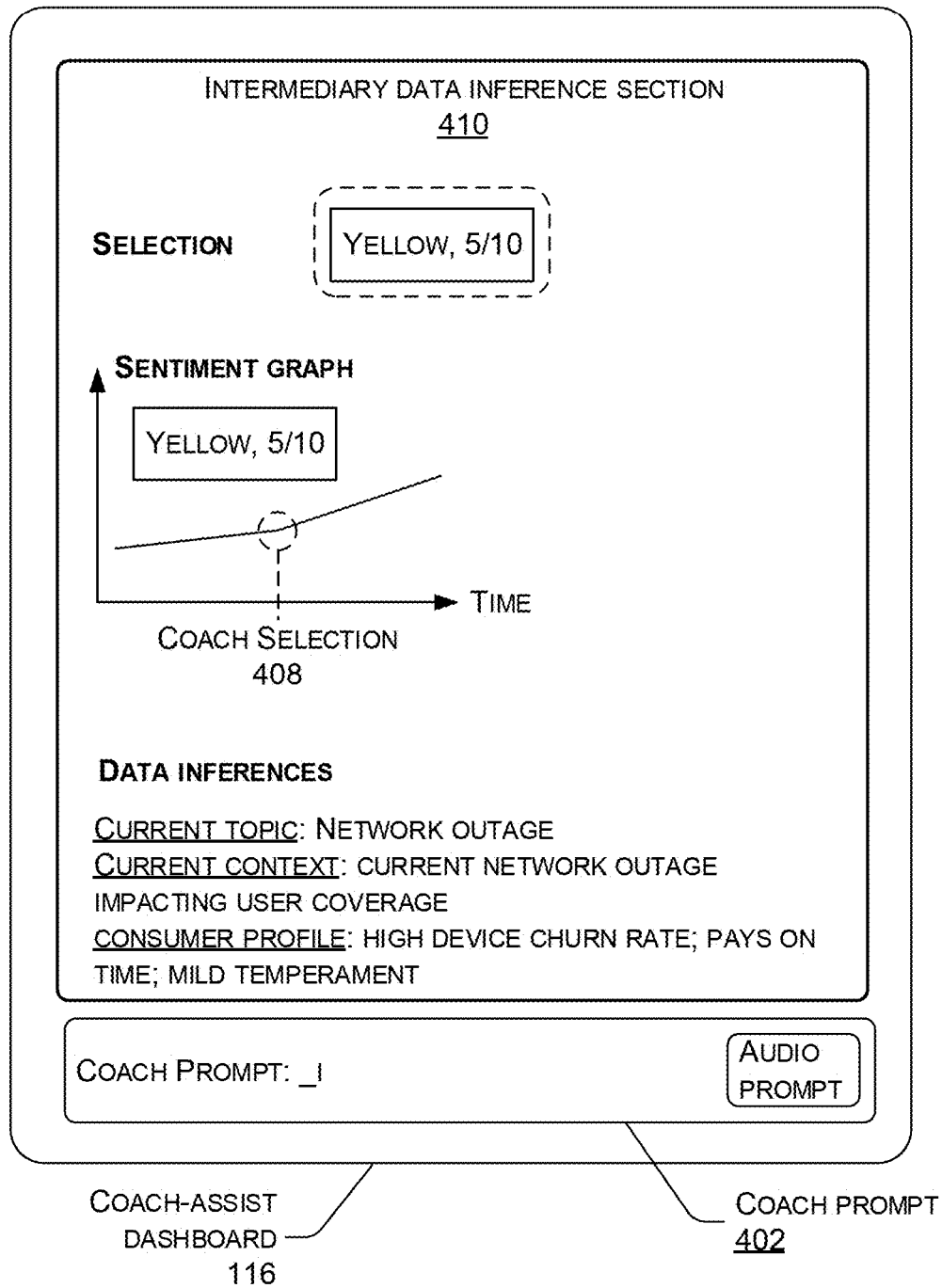

FIGS. 4A and 4B illustrate exemplary presentations of a coach-assist dashboard of a coach device. The coach-assist dashboard 116 is intended to provide a coach device 114 with a rolling account of an ongoing consumer-CSR interaction. The coach-assist dashboard 116 may include a coach prompt 402, which provides a platform for the coach to send text messages, audio messages (e.g., audio prompt), or a suitable combination of both, to the CSR, while the CSR is engaged in the consumer-CSR interaction.

FIG. 4A illustrates a first presentation of the coach-assist dashboard 116. The first presentation may include a dialogue section 404 in one portion of the coach-assist dashboard 116. The dialogue section 404 may comprise selectable text segments that attributed to speaking contributors of the consumer-CSR interaction, namely the consumer and the CSR. Each text segment is selectable, meaning that the selected coach may select a text segment to hear audio of the text segment, as spoken by the speaking contributor. In this way, the audio may provide the selected coach with insight into the consumer or the CSR sentiment during the consumer-CSR interaction.

The first presentation may also include a current state section 406 that is adjacent to the dialogue section 404. The current state section 406 may include selectable weighted-interaction scores that align with corresponding text segments of the consumer-CSR interaction. In this way, the selected coach may correlate changes in the weighted-interaction score of the consumer-CSR interaction with particular text segments.

In some embodiments, the selected coach may select a weighted-interaction score (e.g., coach selection 408) to view the intermediary data inferences used to generate the weighted-interaction score.

FIG. 4B illustrates a second presentation of the coach-assist dashboard 116 that includes an intermediary data inference section 410. The intermediary data inference section 410 may present intermediary data inferences used to generate the weighted-interaction score. The intermediary data interferences may be based on one or more of the intermediary data models, namely the topic data model, the sentiment data model, the context data model, the consumer profile data model, and the profit-loss data model.

In some embodiments, the intermediary data inference section 410 may present a text summary of the intermediary data inference. Referring to FIG. 4A, the text summary of the current topic is "network outage," current context is "current network outage, impacting user coverage," and consumer profile "high device church rate." The intermediary data inference section 410 may include other data inferences such as the profit-loss inference.

In some embodiments, a graphical representation of changes in a data inference may be provided. Referring to FIG. 4B, a sentiment graph associated with the sentiment inference is shown over a time interval that correlates with the ongoing consumer-CSR interaction. The coach selection 408 of FIG. 4B is intended to align with the coach selection 408 of FIG. 4A. Thus, the sentiment graph may present changes in sentiment that temporally occur before and after the coach selection 408.

Moreover, the intermediary data inference section 410 may include accuracy scores associated with each data inference. The accuracy score may indicate to the selected coach a degree of confidence associated with an inferred data inference. A high accuracy score may indicate that a data inference is reliably accurate, while a low accuracy score may indicate a low level of confidence in the accuracy of the data inference.

Figure 5:
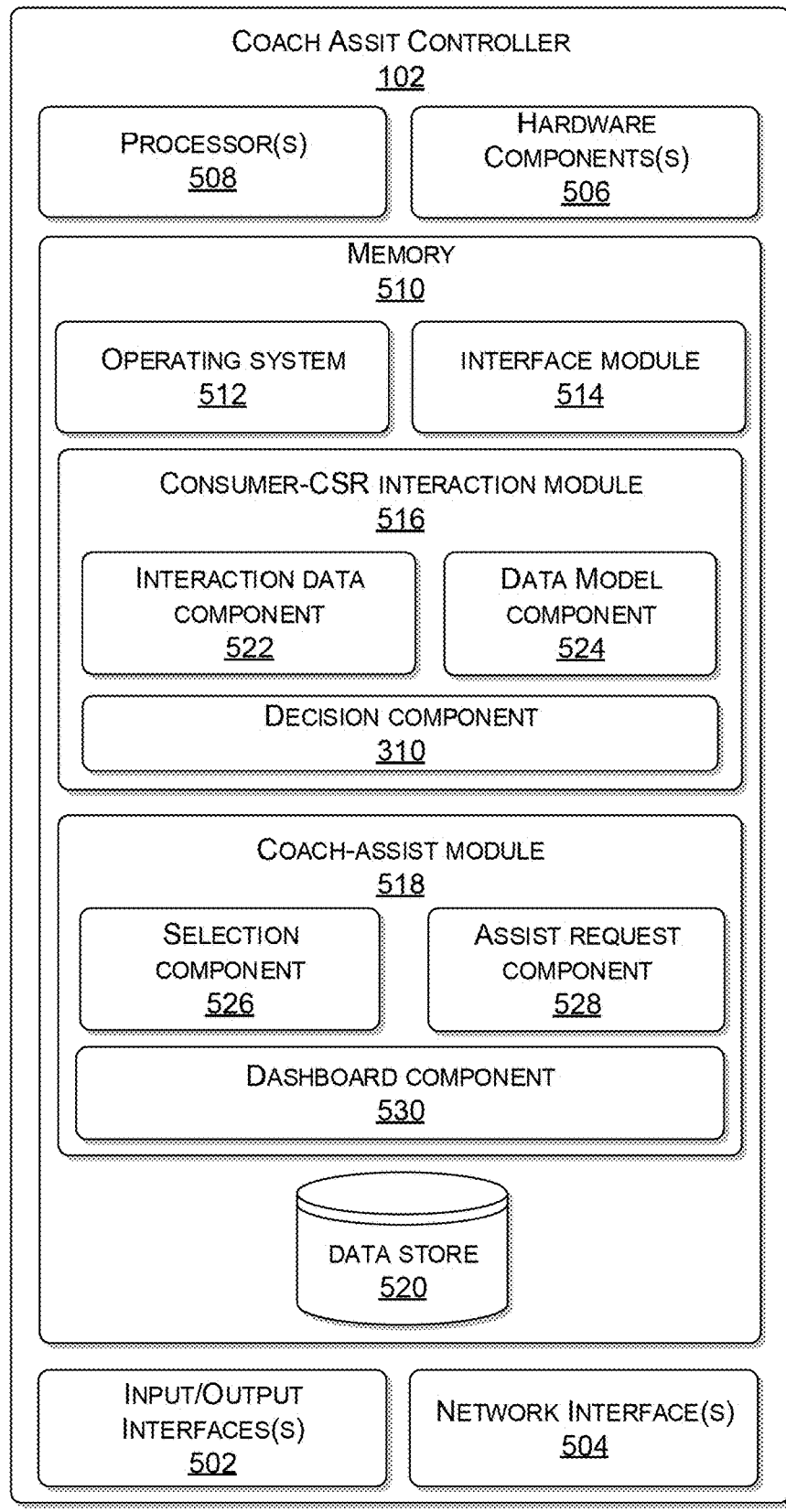
FIG. 5 illustrates various components of an example coach-assist controller.

FIG. 5 illustrates various components of an example coach-assist controller. The coach-assist controller may analyze interaction data associated with a consumer-CSR interaction, and further determine whether to request a coach support for the CSR. The coach-assist controller 102 may provide a coach device with access to a record of an ongoing consumer-CSR interactions (e.g., audio segments, transcribed text of audio segments, or a combination of both) and real-time data inferences drawn from analyses of the ongoing consumer-CSR interaction. Further, the coach-assist controller 102 may establish a communication channel between a CSR device and a coach device, such that the coach may provide the CSR with real-time feedback that is intended to help resolve the service inquiry.

The coach-assist controller 102 may include input/output interface(s) 502. The input/output interface(s) 502 may include any suitable type of output interface known in the art, such as a display (e.g., a liquid crystal display), speakers, a vibrating mechanism, or a tactile feedback mechanism. Input/output interface(s) 502 also includes ports for one or more peripheral devices, such as headphones, peripheral speakers, or a peripheral display. Further, the input/output interface(s) 502 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the coach-assist controller 102 may include network interface(s) 504. The network interface(s) 504 may include any suitable sort of transceiver known in the art. For example, the network interface(s) 504 may include a radio transceiver that performs the function of transmitting and receiving radio frequency communications via an antenna. Also, the network interface(s) 504 may include a wireless communication transceiver and a near-field antenna for communicating over unlicensed wireless Internet Protocol (IP) networks, such as local wireless data networks and personal area networks (e.g., Bluetooth or near field communication (NFC) networks). Further, the network interface(s) 504 may include wired communication components, such as an Ethernet port or a Universal Serial Bus (USB). Hardware component(s) 506 may include additional hardware interface, data communication hardware, and data storage hardware.

Further, the coach-assist controller 102 may include one or more processor(s) 508 that are operably connected to memory 510. In at least one example, the one or more processor(s) 508 may be a central processing unit(s) (CPU), graphics processing unit(s) (GPU), or both a CPU and GPU or any suitable sort of processing unit(s). Each of the one or more processor(s) 508 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 508 may also be responsible for executing all computer applications stored in the memory, which can be associated with common types of volatile (RAM) and/or non-volatile (ROM) memory.

In some examples, memory 510 may include system memory, which may be volatile (such as RAM), non-volatile (such as ROM, flash memory, etc.), or some combination of the two. The memory may also include additional data storage devices (removable and/or non-removable) such as, for example, magnetic disks, optical disks, or tape.

The memory 510 may further include non-transitory computer-readable media, such as volatile and nonvolatile, removable and non-removable media implemented in any suitable method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any suitable non-transitory medium which can be used to store the desired information.

In the illustrated example, the memory 510 may include an operating system 512, an interface module 514, a consumer-CSR interaction module 516, a coach-assist module 518, and a data store 520. The operating system 512 may be any suitable operating system capable of managing computer hardware and software resources. The operating system 512 may include an interface layer that enables applications to interface with the input/output interface(s) 502 and the network interface(s) 504.

The interface module 514 may be configured to interact with a customer support data center, third-party server(s), and a coach device. Regarding the customer support data center, the interface module 514 may intercept consumer-CSR communications between a consumer and a CSR. The customer support data center may establish communication channels between the consumer and CSR. By interacting with the customer support data center, the interface module 514 may access audio segments of the ongoing consumer-CSR interaction, interaction metadata, and consumer profile data associated with the consumer. The interface module 514 may further act as a conduit to establishing a communication channel between the CSR device and coach device via the customer support data center.

The interface module 514 may further interact with the third-party server(s) to capture environmental data associated with a geolocation of the consumer device.

The interface module 514 may further interact with a coach device as part of establishing a communication channel between the coach device and the CSR device. In one embodiment, the communication channel may take the form of a coach-assist dashboard presented on a user interface of the coach device.

The consumer-CSR interaction module 516 may further include an interaction data component 522, a data model component 524, and a decision component 310. The interaction data component 522 may employ one or more machine-learning algorithms to generate interaction data associated with an ongoing consumer-CSR interaction. The interaction data may include audio segments of the consumer-CSR interaction, transcribed text of the audio segments, a consumer profile, and environmental data associated with a geolocation of the consumer device. For example, the interaction data component 522 may analyze audio segments of a consumer-CSR interaction using natural language processing and natural language understanding algorithms, to transcribe the audio segments to text. Further, the interaction data component 522 may use interaction metadata retrieved from the customer support data center to determine the geolocation of the consumer during the consumer-CSR interaction. In doing so, the interaction data component 522 may capture environmental data associated with the geolocation. Environmental data may include real-time public or private events, current and forecast weather conditions, and real-time and forecast service issues (e.g., telecommunication service outage, congestion, etc.).

The data model component 524 may be configured to analyze the interaction data to generate data inferences relating to the consumer-CSR interaction. The data model component 524 may generate a plurality of intermediary data models, such as but not limited to, a topic data model, a sentiment data model, a context data model, a consumer profile data model, and a profit-loss data model. Each data model may generate a data inference that is then used as an input into an aggregate data model.

The data model component 524 may generate a topic data model. The topic data model may employ one or more trained machine-learning algorithms to infer the topic of a consumer-CSR interaction based on keywords and phrases used during the interaction. The data model component 524 may continuously update and train the topic data model to refine its accuracy in inferring known topics. Moreover, since a consumer-CSR interaction may include discussions on various topics, the topic data model may assign more than one topic to a consumer-CSR interaction. For example, the topic data model may assign a first topic to an initial segment of the consumer-CSR interaction, and subsequent topics to subsequent segments. Moreover, the topic data model may assign more than one topic to a segment of a consumer-CSR interaction. For example, the consumer-CSR interaction may relate to an account credit request due to poor network service. In this example, the segment of the consumer-CSR interaction may be assigned two topics, namely accounting services, and network services.

Moreover, the data model component 524 may generate a sentiment data model. The sentiment data model may employ one or more trained machine-learning algorithms to infer a consumer sentiment, and changes to the consumer sentiment, during the consumer-CSR interaction. The sentiment data model may be configured to analyze audio segments and text segments to detect changes in tonality, vocabulary, points of inflection, and/or so forth. In some embodiments, the sentiment data model may generate and assign a sentiment score to segments of the consumer-CSR interaction. The sentiment score may be an alpha-numeric expression (e.g., 1 to 10, or A to F), a descriptive expression (e.g., pleasant, neutral, or angry), based on color (e.g., green, yellow, or red), or any other suitable scale that reflects consumer sentiment. For example, a low sentiment score (e.g., 1 to 3, A to B, pleasant, or green) may indicate that the consumer is pleasant and cooperative. A medium sentiment score (e.g., 4 to 6, C to D, neutral, or yellow) may indicate that the consumer is neutral, a matter of fact, or dispassionate about the interaction. A high sentiment score (e.g., 7 to 10, E to F, angry, red) may indicate that the consumer is frustrated and may be irrational.

In some embodiments, the sentiment data model may glean data from the consumer profile to determine a baseline sentiment from the consumer. In this way, the sentiment data model may selectively calculate the sentiment score relative to the consumer's baseline sentiment. For example, a typically angry consumer may receive a medium sentiment score, if the consumer is exhibiting signs of aggression that are expected of their typical baseline sentiment. Alternatively, the sentiment score may be based on the sentiment of a reasonable consumer rather than being calculated relative to a consumer's baseline sentiment. For example, the typically angry consumer may receive a high sentiment score, if the consumer is exhibiting signs of aggression, as measured relative to a reasonable consumer, even though those signs of aggression are less than what is typically expected of their baseline.

Further, the data model component 524 may generate a context data model. The context data model may employ one or more trained machine-learning algorithms to infer an environmental context of the consumer-CSR interaction. Environmental context may relate to current events trending on a local or national level that impact the consumer's disposition. Environmental context may impact the topic of the consumer-CSR interaction, the sentiment of the consumer, or a combination of both. In one embodiment, the context data model may analyze environmental data gleaned from third-party servers to determine whether the environmental data may impact the consumer's disposition based on knowledge of the consumer profile or the consumer geolocation. For example, a current event associated with the consumer's demographic may impact the consumer's disposition during the consumer-CSR interaction. Similarly, weather conditions impacting the consumer's geolocation may impact the consumer's disposition during the consumer-CSR interaction.

Accordingly, the context data model may correlate interaction data associated with the consumer-CSR interaction with environmental data to determine whether the environmental data may influence the consumer-CSR interaction. Alternatively, the context data model may analyze the environmental data independent of the interaction data, to determine whether environmental data may influence the consumer-CSR interaction.

In one embodiment, the context data model may identify environmental data (e.g., weather event, cultural event, national event, personal event) that may be relevant to an ongoing consumer-CSR interaction. As stated earlier, relevance may be based on the geolocation of the consumer or the consumer profile data (e.g., demographic, personal anniversaries, cultural anniversaries, etc.). Further, the context data model may generate a context score that infers the likelihood that the inferred context is relevant to the consumer-CSR interaction. The context score may be an alphanumeric expression (e.g., 1 to 10, or A to F), a descriptive expression (e.g., unlikely relevant, neutral, or likely relevant), based on color (e.g., red, yellow, or green), or any other suitable scale that reflects consumer sentiment. For example, a low context score (e.g., 1 to 3, E to F, unlikely relevant, or red) may indicate that the context is unlikely relevant to the consumer-CSR interaction. A medium context score (e.g., 4 to 6, C to D, neutral, or yellow) may indicate that the context may or may not be relevant to the consumer-CSR interaction. A high sentiment score (e.g., 7 to 10, A to B, likely relevant, green) may indicate that the context is likely relevant to the consumer-CSR interaction.

The data model component 524 may generate a consumer profile data model. The consumer profile data model may employ one or more trained machine-learning algorithms to analyze a consumer profile to infer expected consumer behaviors. For example, the consumer profile data model may determine a propensity of the consumer to churn through devices, creditworthiness (e.g., typically pays on time, pays late, has an outstanding credit balance, or an overdue debt balance), frequency, and reasoning for contacting customer service support, the listing of resolved service issues, the listing of unresolved service issues, typical baseline sentiment, and a profit and loss that is attributable to the consumer.

The data model component 524 may generate the consumer profile data model to develop consumer baseline thresholds that may be used by other data models, such as the sentiment data model and the context data model. For example, the consumer profile data model may include a baseline sentiment of the consumer, to which the sentiment data model may use to infer a change in consumer sentiment relative to their baseline. Similarly, the consumer profile data model may include a demographic data, employment data, anniversary data, propensity, creditworthiness data, to which the context data model may use to infer an environmental context of the consumer-CSR interaction.

The data model component 524 may generate a profit-loss data model. The profit-loss data model may employ one or more trained machine-learning algorithms to analyze interaction data to identify service resolutions requested by a consumer or offered by the CSR during a consumer-CSR interaction. In doing so, the profit-loss data model may further determine the profit or loss record associated with those service resolutions.

In some embodiments, CSRs, or CSR working groups are required to manage a profit and loss record associated with service resolutions. Accordingly, the profit-loss data model may receive, as an input, the current status of the CSR, or CSR working group, profit and loss record, and further determine how a potential service resolution for a consumer-CSR interaction would impact the profit and loss record. For example, a consumer may view a service refund as a good outcome of a Consumer-CSR interaction. However, the CSR, or CSR working group, may view that same service refund less favorably as adversely impact the profit and loss record of the CSR or the CSR working group.

Therefore, if the cost of a service resolution discussed during a consumer-CSR interaction would negatively impact the profit and loss record of the CSR, or the CSR working group, the profit-loss data model may generate a data inference indicating the negative financial impact of the service resolution.

In some embodiments, the profit-loss data model may generate a profit-loss score that indicates the likely impact of a financial loss to the profit-loss record of the CSR, or CSR working group. The profit-loss score may be an alphanumeric expression (e.g., 0 to 10, or A to F), a descriptive expression (e.g., low, medium, or high), based on color (e.g., red, yellow, or green), or any other suitable scale that reflects the likely impact of a financial loss to the profit-loss record. A high profit-loss score (e.g., 7 to 10, A to B, high, red) may indicate an overly adverse financial impact on the profit-loss record. A medium profit-loss score (e.g., 4 to 6, C to D, medium, yellow) may indicate a manageable financial impact on the profit-loss record. A low-profit loss (e.g., 1 to 3, A to B, low, green) may indicate no financial impact or a favorable financial impact (e.g., profit) to the profit-loss record.

In various embodiments, the data model component 524 may generate an accuracy score for the data inferences associated with each of the intermediary data models, namely the topic data model, the sentiment data model, the context data model, the consumer profile data model, and profit-loss data model. The accuracy scores may indicate the degree of confidence associated with a data inference. For example, consider the topic data model. The data model component 524 may generate a topic accuracy score to indicate the degree of confidence in the inferred topic of the topic data model. The topic accuracy score may an alphanumeric expression (e.g., 1 to 10, or A to F), a descriptive expression (e.g., high, medium, or low), based on color (e.g., green, yellow, or red), or any other suitable scale that reflects a likely accuracy of the inferred topic. A high topic accuracy score (e.g., 7 to 10, A to B, high, or green) may indicate a high level of confidence that the inferred topic is accurate. A medium topic accuracy score (e.g., 4 to 6, C to D, medium, or yellow) may indicate a moderate level of confidence that the inferred topic is accurate. A low topic accuracy score (e.g., 1 to 3, E to F, low, or red) may indicate a low level of confidence that the inferred topic is accurate.

The aggregate data model may be configured to receive, as an input, data inferences generated from the intermediary data models (e.g., consumer profile data model, sentiment data model, context data model, and profit-loss data model), and generate a weighted-interaction score that may be used to determine whether to request coach support for an ongoing consumer-CSR interaction. The weighted-interaction score may be configured to analyze multiple dimensions (e.g., data inferences generated by the intermediary data models) associated with the consumer-CSR interaction to determine whether a coach support is beneficial.

The weighted-interaction score may be an alpha-numeric expression (e.g., 0 to 10, or A to F), a descriptive expression (e.g., low, medium, or high), based on color (e.g., red, yellow, or green), or any other suitable scale that reflects a likely benefit of soliciting coach support. For example, a high weighted-interaction score (e.g., 7 to 10, A to B, high, or red) may indicate that coach support may have a positive impact on the consumer-CSR interaction. A medium weighted-interaction score (e.g., 4 to 6, C to D, medium, yellow) may indicate that coach support may or may not have a positive impact on the consumer-CSR interaction. A low weighted-interaction score (e.g., 1 to 3, E to F, low, green) may indicate that the coach support is unlikely to have a positive impact on the consumer-CSR interaction.

By way of example, consider a consumer that has reached out to customer support regarding payment of an overdue service account. The service account may relate to the use of a mobile device within a telecommunications network. In this example, the consumer profile model may indicate that the consumer has an overdue balance and thus may be a credit risk. The topic data model may analyze an audio segment of the consumer-CSR interaction to determine that the topic of the consumer-CSR interaction relates to accounting services. Further, the sentiment data model may determine that the consumer's temperament, relative to the consumer profile baseline, is agitated. The context data model may determine that the consumer's employer has recently reduced the size of its workforce within the geographic region that the consumer resides. Accordingly, the aggregate data model may aggregate the data inferences from each of the intermediary data models to assign the consumer-CSR interaction a high score based on the underlying data (e.g., an agitated consumer inquiring about account services for an overdue balance after the consumer may have been made redundant).

The data model component 524 may generate each intermediary data model and aggregate data model using historical consumer-CSR interaction data. The data model component 524 may continuously update each intermediary data model and the aggregate data model as more historical interaction data become available. As such, continuously more accurate intermediary data modes and aggregate data model can be developed.

For example, each intermediary data model and the aggregate data model is continuously updated to reflect the resolution of a consumer-CSR interaction and the means by which a resolution, if any, is achieved. Example means may include the inclusion of coach support, a conversational technique (or script) that was adopted by the CSR or recommended by the coach. Data points associated with positive and negative resolutions may be used to train each intermediary data model and the aggregate data model, such that each prospective data inference tends towards an expected, real-world consumer-CSR interaction outcome. In some examples, the data points may be associated with an interaction topic (e.g., accounting services, device services, technical services, etc.), a resolution technique, a conversational technique (or conversational script) used to impact resolution, a specific CSR, a specific coach, a change in sentiment, or any suitable combination thereof.

The decision component 310 may determine the current state of the consumer-CSR interaction. The current state of the consumer-CSR interaction may comprise a first state in which a coach-assist is unlikely to provide benefit to the CSR, a second state in which a coach support may, or may not, provide benefit to the CSR, and a third state in which a coach support is likely to provide benefit to the CSR. The current state may be reflected by a weighted-interaction score of the consumer-CSR interaction. In some embodiments, the decision component 310 may compare the weighted-interaction score with a predetermined interaction threshold. In doing so, the decision component 310 may determine that a coach support request is required for a consumer-CSR interaction with a weighted-interaction score that is greater than or equal to the predetermined interaction threshold. Similarly, the decision component 310 may determine that coach support is not required for the weighted-interaction score that is less than the predetermined interaction threshold. The predetermined interaction threshold may be set by an administrator or operator of the customer support data center or the coach-assist controller.

Alternatively, the decision component 310 may determine that high weighted-interaction scores (e.g., 7 to 10, A to B, high, or red) require coach support. Similarly, medium weighted-interaction scores (e.g., 4 to 6, C to D, medium, yellow) may be recommended for coach support.

The coach-assist module 518 may further include a selection component 526, a coach-assist component 528, and a dashboard component 530. The selection component 526 may be configured to select a coach from a plurality of coach profiles, to provide coach support to a consumer-CSR interaction. The selection component 526 may employ one of at least three coach selection methods to analyze and identify a coach from the plurality of coach profiles. Without limitation, the coach selection methods include a designated coach selection method, a floating coach selection method, and a profit-loss coach selection method.

The designated coach selection method comprises selecting a coach that is designated to a CSR. In other words, each CSR is assigned a supervisory coach, and if the decision component 310 elects to solicit coach support, the designated coach selection method is configured to select the CSR's supervisory coach.

The floating coach selection method comprises selecting a coach based on the coach's expertise relative to the specific needs of a consumer-CSR interaction. For example, consider a consumer-CSR interaction that is impacted by consumer sentiment. In this example, the floating coach selection method may be used to select a coach that is proficient in de-escalating angry consumers. In another example, consider a consumer-CSR interaction that is deeply focused on accounting services. Here, the floating coach selection method may be used to select a coach with accounting service expertise.

The profit-loss coach selection method comprises selecting a coach based on the coach's expertise in reducing the impact of a likely financial loss due to a service resolution being discussed during the consumer-CSR interaction.

In some examples, the selection component 526 may employ one or more trained machine-learning algorithms to select a coach from a subset of coaches identified using at least three coach selection methods. For example, the selection component 526 may identify coaches using each of the three coach selection methods. In doing so, the selection component 526 may analyze each coach profile relative to the consumer-CSR interaction to determine which of the identified coaches is best suited to provide coach support to the CSR. For example, if the aggregate data model analyzes the consumer-CSR interaction and indicates that a particular consumer-CSR interaction is being impacted by an angry consumer, the selection component 526 may select one of the identified coaches that is best suited to calm the angry consumer. Similarly, if the aggregate data model indicates that a particular financial loss is attributable to a consumer of the consumer-CSR interaction, the selection component 526 may select one of the identified coaches that is best suited to manage the loss record associated with the consumer.

The coach-assist component 528 may be configured to generate a request to solicit coach support from a selected coach. The request may be delivered, via the interface module 514, to a coach device associated with the selected coach. The coach-assist component 528 may receive, via the interface module 514, a response to the coach support request. If the coach-assist component 528 receives a response accepting the coach support request, the coach-assist component 528 may communicate the same to the dashboard component 530 to generate coach support data for delivery to the coach device. Alternatively, if the coach-assist component 528 receives a response declining the coach support request, the coach-assist component 528 may communicate the same to the selection component 526 to initiate the selection of another coach.

The dashboard component 530 may generate coach support data for delivery to a selected coach that has accepted a request for coach support. The coach support data may include computer-executable instructions that cause a display of a coach-assist dashboard on a user interface of the coach device. The coach-assist dashboard may include text and audio segments of the consumer-CSR interaction, along with real-time data interferences drawn from analyzes of the consumer-CSR interaction. The data inferences may include a reference to an inferred topic and a weighted interaction score. The coach-assist dashboard may be configured such that the coach may select the weighted interaction score to view the data inferences relied upon to generate the weighted interaction score. The data inferences may include the inferred topic, a sentiment score, a context score, a profit-loss score, or any suitable combination thereof. The coach-assist dashboard may also provide a platform for the coach to send text messages, audio messages, or a suitable combination of both, to the CSR, while the CSR is engaged in the consumer-CSR interaction.

The data store 520 may include a repository of environmental data, consumer profiles, interaction data, historical consumer-CSR interaction data, coach selection methods, coach profiles, and any other suitable data pertinent to an operation of the coach-assist controller.

The coach-assist controller 102, via various modules and components, may make use of one or more trained machine-learning algorithms such as supervised learning, unsupervised learning, semi-supervised learning, naive Bayes, Bayesian network, decision trees, neural networks, fuzzy logic models, and/or probabilistic classification models.

Figure 6:
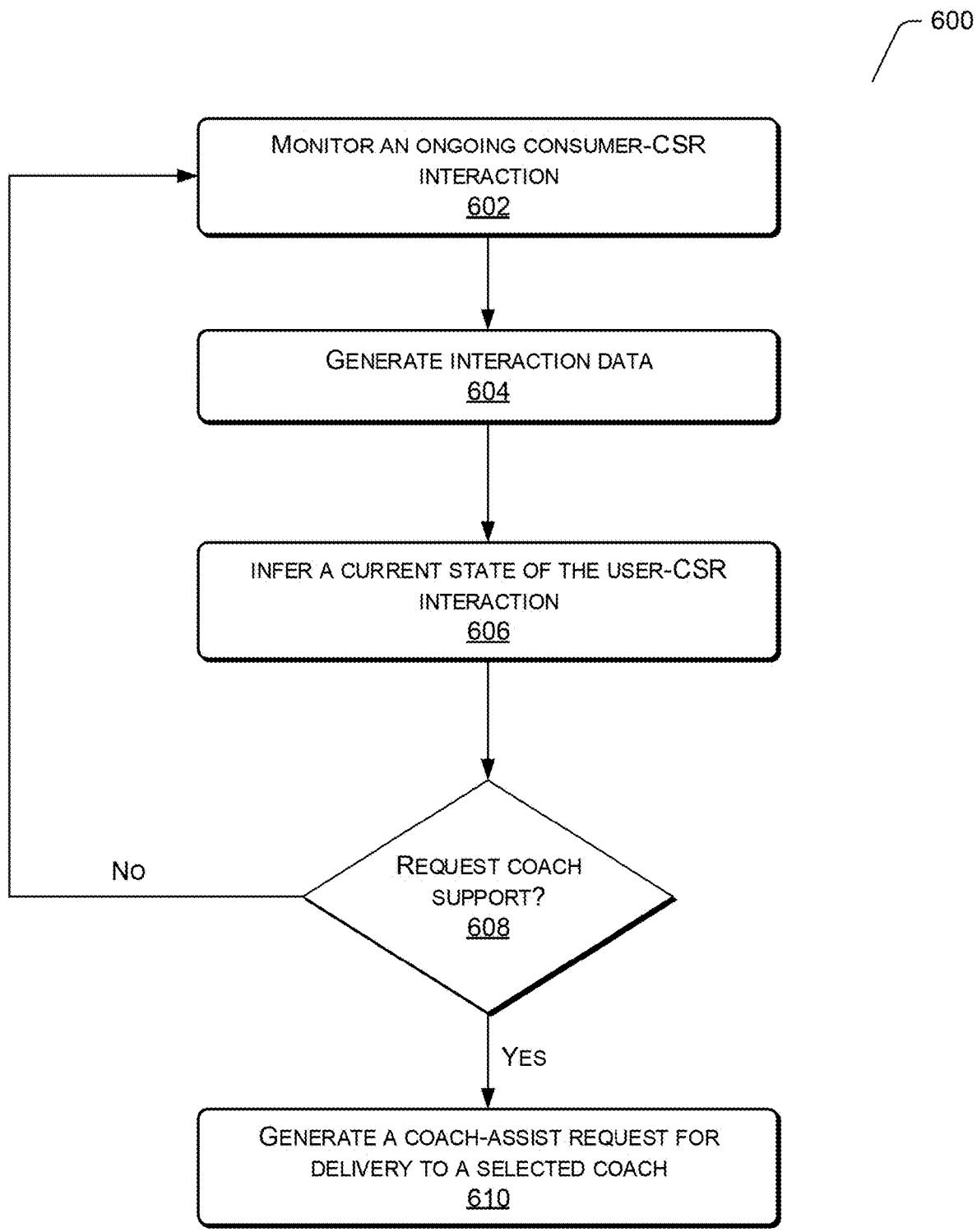
FIG. 6 illustrates an exemplary process of generating a coach support request for delivery to a selected coach.
Figure 7:
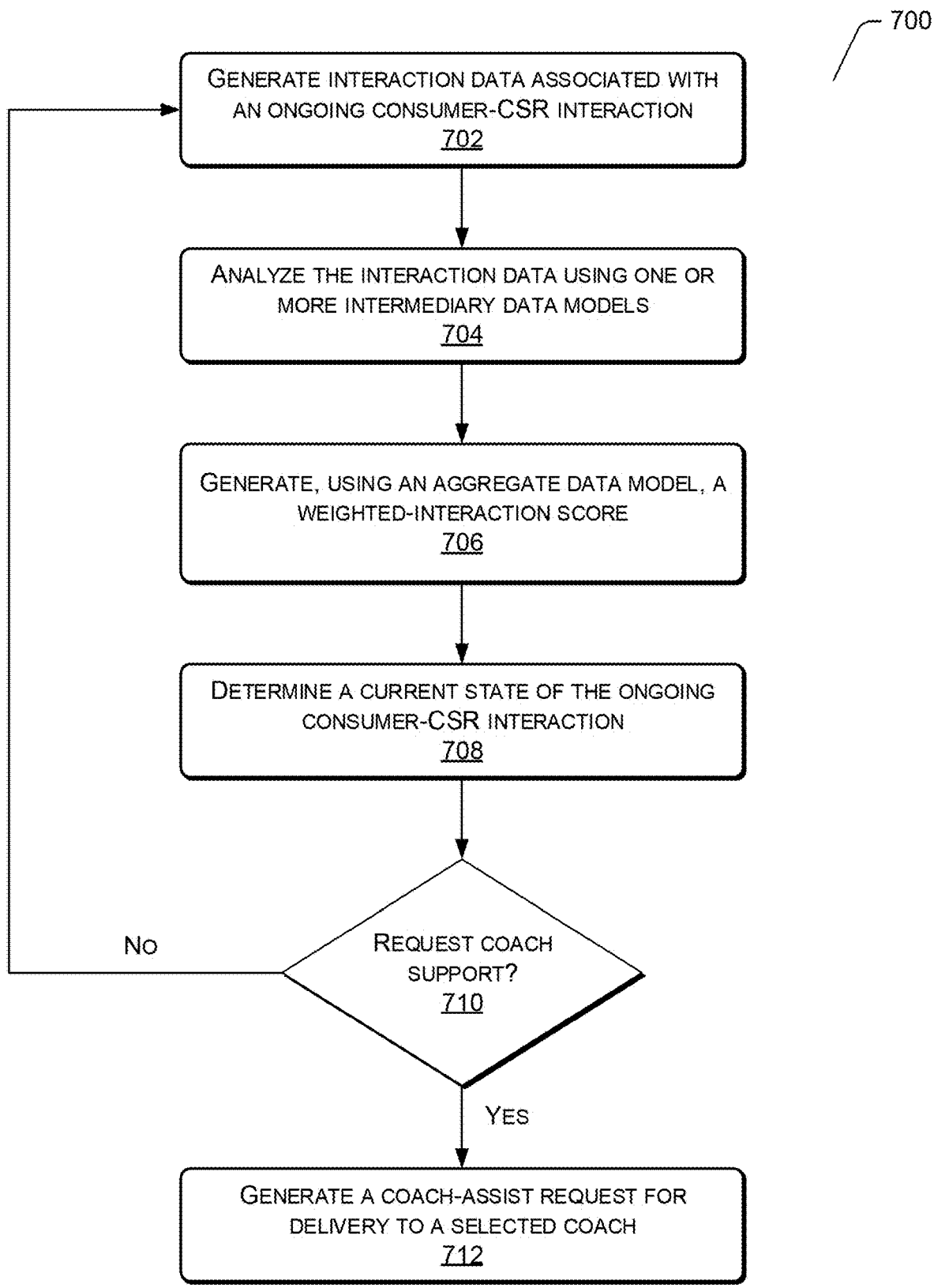
FIG. 7 illustrates an exemplary process of analyzing interaction data of an ongoing consumer-CSR interaction to determine whether to generate a coach support request.
Figure 8:
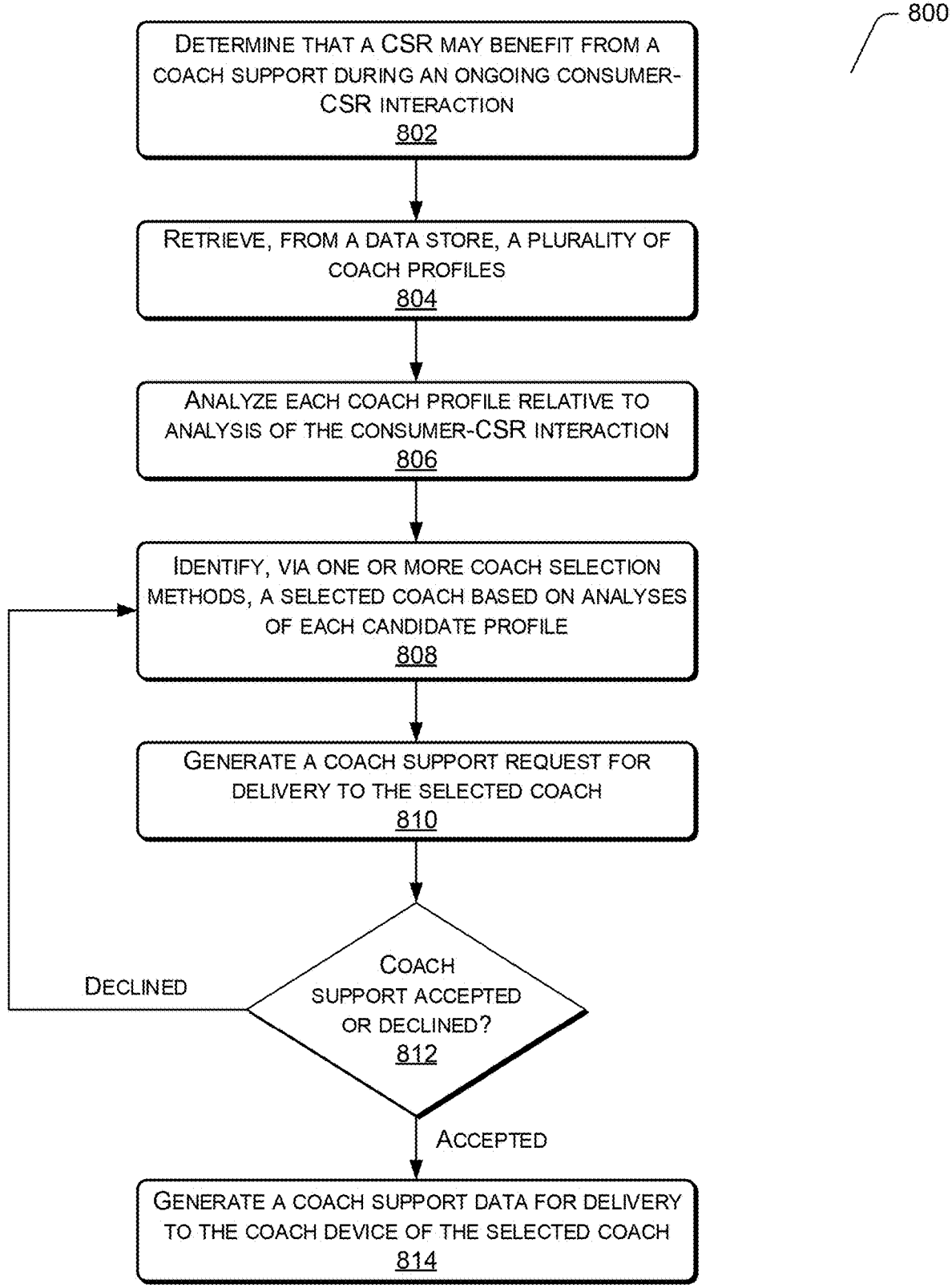
FIG. 8 illustrates an exemplary process of selecting a coach to provide coach support during an ongoing consumer-CSR interaction.

FIGS. 6, 7, and 8 present processes 600, 700, and 800 that relate to operations of the coach-assist controller 102. Each of processes 600, 700, and 800 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600, 700, and 800 are described with reference to the computing environment 100 of FIG. 1.

FIG. 6 illustrates an exemplary process of generating a coach support request for delivery to a selected coach. Process 600 is described from the perspective of the coach-assist controller.

At 602, the coach-assist controller may monitor, at a customer support data center, ongoing consumer-CSR interactions in real-time or near-real-time. In one embodiment, the coach-assist controller may monitor substantially all consumer-CSR interactions. In another embodiment, the coach-assist controller may monitor a selection of consumer-CSR interactions based on a triggering event. The triggering event may involve a particular topic of the consumer-CSR interaction, a particular consumer, a particular CSR, a particular service issue request, or any suitable combination thereof. In yet another embodiment, the coach-assist controller may monitor a random selection, but not all, consumer-CSR interactions.

At 604, the coach-assist controller may employ one or more machine-learning algorithms to generate interaction data associated with the consumer-CSR interaction. The interaction data may include audio segments of the consumer-CSR interaction, transcribed text of the audio segments, a consumer profile, and environmental data associated with a geolocation of the consumer device.

At 606, the coach-assist controller may infer a current state of the consumer-CSR interaction based on analysis of the interaction data. The current state may correspond to one of a first state, a second state, or a third state. The first state may infer that coach support is unlikely to provide benefit to a CSR during an ongoing consumer-CSR interaction. The second state may infer that a coach support may, or may not, provide benefit to the CSR during an ongoing consumer-CSR interaction. The third state may infer that a coach support is likely to provide benefit to the CSR during an ongoing consumer-CSR interaction.

At 608, the coach-assist controller may determine whether to request coach support based at least in part on the current state of the consumer-CSR interaction. If the coach-assist controller determines that coach support is not required (e.g., first state or second state), process 600 may return to process step 602, and the coach-assist controller may continue to monitor the ongoing consumer-CSR interaction. However, if the coach-assist controller determines that coach support may benefit the CSR during an ongoing consumer-CSR interaction (e.g., second state or third state), process 600 may continue to process step 610.

At 610, the coach-assist controller may generate a coach support request for delivery to a coach device of a selected coach. The coach support request may solicit the selected coach to accept or decline the coach support request. If the selected coach declines the request for coach support, the coach-assist controller may elect to solicit an alternate coach. Otherwise, if the selected coach accepts the request for coach support, the coach-assist controller may establish a coach-assist dashboard on a user interface of the coach device. The coach-assist dashboard may provide the selected coach with a communication interface to the CSR, through which the selected coach may provide support to the CSR during the consumer-CSR interaction.

FIG. 7 illustrates an exemplary process of analyzing interaction data of an ongoing consumer-CSR interaction to determine whether to generate a coach support request. Process 700 is described from the perspective of the coach-assist controller.

At 702, the coach-assist controller may generate interaction data associated with an ongoing consumer-CSR interaction in real-time or near-real-time. The interaction data may include audio segments of an ongoing consumer-CSR interaction, transcribed text of the audio segments, a consumer profile, and environmental data gleaned from third-party servers that may impact the consumer's disposition during the consumer-CSR interaction.

At 704, the coach-assist controller may analyze the interaction data using one or more intermediary data models. Each of the intermediary data models may be configured to analyze a particular aspect of an ongoing consumer-CSR interaction.

At 706, the coach-assist controller may use an aggregate data model to analyze the data inferences generated by the intermediary models. The aggregate data model may be configured to receive, as an input, the data inferences generated from the intermediary data models, and in doing so, generate a weighted-interaction score for the ongoing consumer-CSR interaction.

At 708, the coach-assist controller may determine the current state of the ongoing consumer-CSR interaction based at least in part on the weighted-interaction score. The current state of the ongoing consumer-CSR may indicate whether coach support is likely to benefit the CSR, may or may not benefit the CSR, or is unlikely to benefit the CSR during an ongoing consumer-CSR interaction.

At 710, the coach-assist controller may determine whether to request coach support based at least in part on the current state of the consumer-CSR interaction. If the coach-assist controller determines that coach support would not benefit the CSR during the consumer-CSR interaction, process 700 may return to process 702, and the coach-assist controller may continue to generate interaction data for the ongoing consumer-CSR interaction. If, however, the coach-assist controller determines that coach support may benefit the CSR during the consumer-CSR interaction, process 700 may continue to process step 712.

At 712, the coach-assist controller may generate a coach support request for delivery to a coach device of a selected coach. The coach support request may solicit the selected coach to accept or decline the coach support request. If the selected coach declines the request for coach support, the coach-assist controller may elect to solicit an alternate coach. Otherwise, if the selected coach accepts the request for coach support, the coach-assist controller may establish a coach-assist dashboard on a user interface of the coach device. The coach-assist dashboard may provide the selected coach with a communication interface to the CSR, through which the selected coach may provide support to the CSR during the consumer-CSR interaction.

FIG. 8 illustrates an exemplary process of selecting a coach to provide coach support during an ongoing consumer-CSR interaction. Process 800 is described from the perspective of the coach-assist controller.

At 802, the coach-assist controller may determine that a CSR may benefit from coach support during an ongoing consumer-CSR interaction. In one embodiment, the coach-assist controller may infer the benefit of coach support based on the current state of the consumer-CSR interaction. In one embodiment, the coach-assist controller may determine the current state of the consumer-CSR interaction using the analysis of an aggregate data model. The aggregate data model may aggregate data inferences drawn from the intermediary data model(s) that each analyzes a discrete aspect of the consumer-CSR interaction. The intermediary data model(s) include a topic data model, a sentiment data model, a context data model, a consumer profile data model, and a profit-loss data model.

At 804, the coach-assist controller may retrieve, from a data store, a plurality of coach profiles. Each coach profile may correspond to a coach that is a candidate for providing coach support during the ongoing consumer-CSR interaction.

At 806, the coach-assist controller may analyze each candidate coach profile relative to the analyses of ongoing consumer-CSR interaction. That is, the coach-assist controller may analyze each candidate coach profile relative to the aggregate data model and intermediary data model(s) to identify a selected coach. The coach-assist controller may identify a selected coach using one of at least three coach selection methods. Without limitation, the coach selection methods include a designated coach selection method, a floating coach selection method, and a profit-loss coach selection method. The designated coach selection method comprises selecting a coach that is designated to a CSR. The floating coach selection method comprises selecting a coach based on the coach's expertise (e.g., de-escalating angry consumers or proficiency in a service support topic) relative to the specific needs of the consumer-CSR interaction. The profit-loss coach selection method comprises selecting a coach based on the coach's expertise in reducing the impact of a likely financial loss due to a service resolution being discussed during the consumer-CSR interaction.

At 808, the coach-assist controller may identify a selected coach based on analysis of each candidate profile via one or more of the coach selection methods. In one embodiment, the coach-assist controller may identify a subset of coaches using each of the described coach selection methods. In other words, a first coach may be identified using the designated coach selection method, a second coach may be identified via the floating coach selection method, and a third coach may be identified by the profit-loss selection method. In doing so, the coach-assist controller may further analyze each coach profile within the subset, relative to the analyzes of the aggregate data model and intermediary data model(s) to identify a selected coach to provide coach support to the CSR. The further analysis may focus on identifying which aspect of the consumer-CSR interaction (e.g., topic expertise, de-escalating negative sentiment, profit-loss in-balance) would benefit most from coach support.

At 810, the coach-assist controller may generate a coach support request for delivery to the selected coach. The coach support request may solicit the selected coach to accept or decline the coach support request.

At 812, the coach-assist controller may receive a response from the selected coach that accepts or declines the request to provide coach support to the CSR. If the selected coach declines the request for coach support, process 800 may return to process step 808 to identify an alternate selected coach. Otherwise, if the selected coach accepts the request for coach support, process 800 may continue to process step 814.

At 814, the coach-assist controller may generate coach support data for delivery to the coach device of the selected coach. The coach support data may include computer-executable instructions that cause a display of a coach-assist dashboard on a user interface of the coach device. The coach-assist dashboard may include text and audio segments of the consumer-CSR interaction, along with real-time data interferences drawn from analyzes of the consumer-CSR interaction. The coach-assist dashboard may also provide a platform for the coach to send text messages, audio messages, or a suitable combination of both, to the CSR, while the CSR is engaged in the consumer-CSR interaction.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A coach-assist controller to assist a customer service representative (CSR), comprising:
    one or more processors;
    memory coupled to the one or more processors, the memory including one or more modules that are executable by the one or more processors to:
    generate, in real-time, interaction data associated with a consumer-CSR interaction between a consumer and a CSR;
    analyze, via one or more data models that include one or more trained machine-learning algorithms, the interaction data to generate a set of data inferences associated with the consumer-CSR interaction;
    infer a current state of the consumer-CSR interaction by analyzing, via an aggregated data model that includes one or more trained machine-learning algorithms, the set of data inferences associated with the consumer-CSR interaction;
    determine, in real-time, whether to request a coach support for the CSR based at least in part on the current state; and
    in response to determining to request the coach support, generate a coach support request for delivery to a selected coach device,
    wherein the one or more trained machine-learning algorithms of the one or more data models or the aggregated data model are at least trained using data points associated with positive and negative resolutions of other consumer-CSR interactions.

2. The coach-assist controller of claim 1, wherein the one or more modules are further executable by the one or more processors to:
    capture audio data associated with the consumer-CSR interaction; and
    analyze the audio data using at least one of a natural language processing algorithm or a natural language understanding algorithm, and
    wherein, to generate the interaction data is based at least in part on analysis of the audio data.

3. The coach-assist controller of claim 1, wherein the one or more data models correspond to a topic data model, a sentiment data model, a context data model, and a profit-loss data model.

4. The coach-assist controller of claim 1, wherein the one or more modules are further executable by the one or more processors to:
    generate an interaction score based at least in part on the current state of the consumer-CSR interaction, and
    wherein to determine whether to request the coach support is further based at least in part on the interaction score being greater than a predetermined interaction threshold.

5. The coach-assist controller of claim 1, wherein the one or more modules are further executable by the one or more processors to:
    retrieve, from a data store, a set of coach profiles of individual coaches to support the consumer-CSR interaction; and
    select a particular coach from the set of coach profiles based at least in part on analysis of the set of coach profiles relative to the current state of the consumer-CSR interaction, and
    transmit the request for the coach support to the selected coach device associated with the particular coach.

6. The coach-assist controller of claim 1, wherein the one or more modules are further executable by the one or more processors to:
    receive, from the selected coach device, a response to accept the coach support request; and
    generate a coach-assist dashboard for display on a user interface of the selected coach device, the coach-assist dashboard to include a real-time text and audio account of the consumer-CSR interaction and selectable interaction scores that are associated with individual instances of communication between the consumer and the CSR.

7. The coach-assist controller of claim 6, wherein the one or more modules are further executable by the one or more processors to:
    receive a selection of one of the selectable interaction scores; and
    generate coach support data for delivery to the selected coach device, based at least in part on the selection, the coach support data to include a graphical or textual depiction of at least one of a change in topic or a change in consumer sentiment over time during the consumer-CSR interaction, and
    wherein the coach support data is configured to display on the user interface of the selected coach device.

8. The coach-assist controller of claim 1, wherein the one or more modules are further executable by the one or more processors to:
    determine a geolocation of the consumer, based at least in part on the interaction data; and
    capture, from a third-party server, environmental data associated with the geolocation, the environmental data corresponding to at least one of real-time events, real-time weather conditions, or real-time service issues; and
    determine an interaction context of the consumer-CSR interaction based at least in part on the environmental data, and
    wherein, to infer the current state of the consumer-CSR interaction is further based at least in part on the interaction context.

9. The coach-assist controller of claim 1, wherein the one or more modules are further executable by the one or more processors to:
analyze the interaction data to determine a consumer sentiment, and
wherein, to infer the current state of the consumer-CSR interaction is further based at least in part on the consumer sentiment.

10. The coach-assist controller of claim 9, wherein the one or more modules are further executable by the one or more processors to:
retrieve, from a data store, a consumer profile associated with the consumer; and
generate a sentiment data model based at least in part on the consumer profile, and
wherein to analyze the interaction data comprises correlating the interaction data with data points of the sentiment data model.

11. A computer-implemented method, comprising:
intercepting, at a customer support data center, a consumer-CSR interaction between a consumer and a CSR;
generating, in real-time, interaction data associated with the consumer-CSR interaction;
analyzing, via one or more data models that include one or more trained machine-learning algorithms, the interaction data to generate a set of data inferences associated with the consumer-CSR interaction;
inferring a current state of the consumer-CSR interaction by analyzing, via an aggregated data model that includes one or more trained machine-learning algorithms, the set of data inferences associated with the consumer-CSR interaction; and
in response to the current state indicating a need for the coach support, generating, in real-time, a coach support request for delivery to a selected coach device,
wherein the one or more trained machine-learning algorithms of the one or more data models or the aggregated data model are at least trained using data points associated with positive and negative resolutions of other consumer-CSR interactions.

12. The computer-implemented method of claim 11, wherein
the set of data inferences corresponding to at least one of an interaction topic, a consumer sentiment, or an interaction context associated with the consumer-CSR interaction.

13. The computer-implemented method of claim 12, wherein analyzing the set of data inferences analyzing comprises:
correlating the set of data inferences with data points of the aggregate data model; and
inferring, via the aggregate data model, the current state of the consumer-CSR interaction.

14. The computer-implemented method of claim 11, further comprising:
retrieving, from a data store, a set of coach profiles of coaches to support the consumer-CSR interaction;
selecting a particular coach from the set of coach profiles based at least in part on an analysis of the set of coach profiles and the interaction data; and
transmitting the request for the coach support to the selected coach device associated with the particular coach.

15. The computer-implemented method of claim 11, further comprising:
receiving, from the selected coach device, a response to accept the coach support request; and
generating a coach-assist dashboard for display on a user interface of the selected coach device, the coach-assist dashboard to permit the selected coach device to interact directly with a CSR device associated with the CSR.

16. One or more non-transitory computer-readable media collectively storing computer-executable instructions that, when executed with one or more processors, collectively cause computers to perform acts comprising:
intercepting, at a customer support data center, a consumer-CSR interaction between a consumer and a CSR;
generating, in real-time, interaction data associated with the consumer-CSR interaction;
analyzing, via one or more data models that include one or more trained machine-learning algorithms, the interaction data to generate a set of data interferences associated with the consumer-CSR interaction;
analyzing, via an aggregated data model that includes one or more trained machine-learning algorithms, the set of data inferences associated with the consumer-CSR interactions to infer a current state of the consumer-CSR interaction;
generating an interaction score based at least in part on the current state of the consumer-CSR interaction; and
requesting, in real-time, a coach support for the CSR based at least in part on the interaction score being greater than a predetermined interaction threshold,
wherein the one or more trained machine-learning algorithms of the one or more data models or the aggregated data model are at least trained using data points associated with positive and negative resolutions of other consumer-CSR interactions.

17. The one or more non-transitory computer-readable media of claim 16, wherein the current state of the consumer-CSR interaction is based in part on an interaction topic, a consumer sentiment, or an interaction context.

18. The one or more non-transitory computer-readable media of claim 16, wherein acts further comprise:
retrieving, from a data store, a set of coach profiles of coaches to support the consumer-CSR interaction;
analyze the set of coach profiles relative to the interaction data;
selecting, via one of a plurality of coach selection methods, a particular coach of the set of coach profiles; and
transmitting a request for the coach support to a selected coach device associated with the particular coach.

19. The one or more non-transitory computer-readable media of claim 18, wherein the plurality of coach selection methods include a designated coach method, a floating coach method, or a profit coach method.

* * * * *